3,310,115
NON-METALLIC HORSESHOE AND METHOD OF ATTACHING SAME TO A HORSE'S HOOF
Clayton E. Ward, 9714 Ambro Lane, Woodson Terrace, St. Louis, Mo. 63134
Filed May 17, 1965, Ser. No. 456,350
12 Claims. (Cl. 168—4)

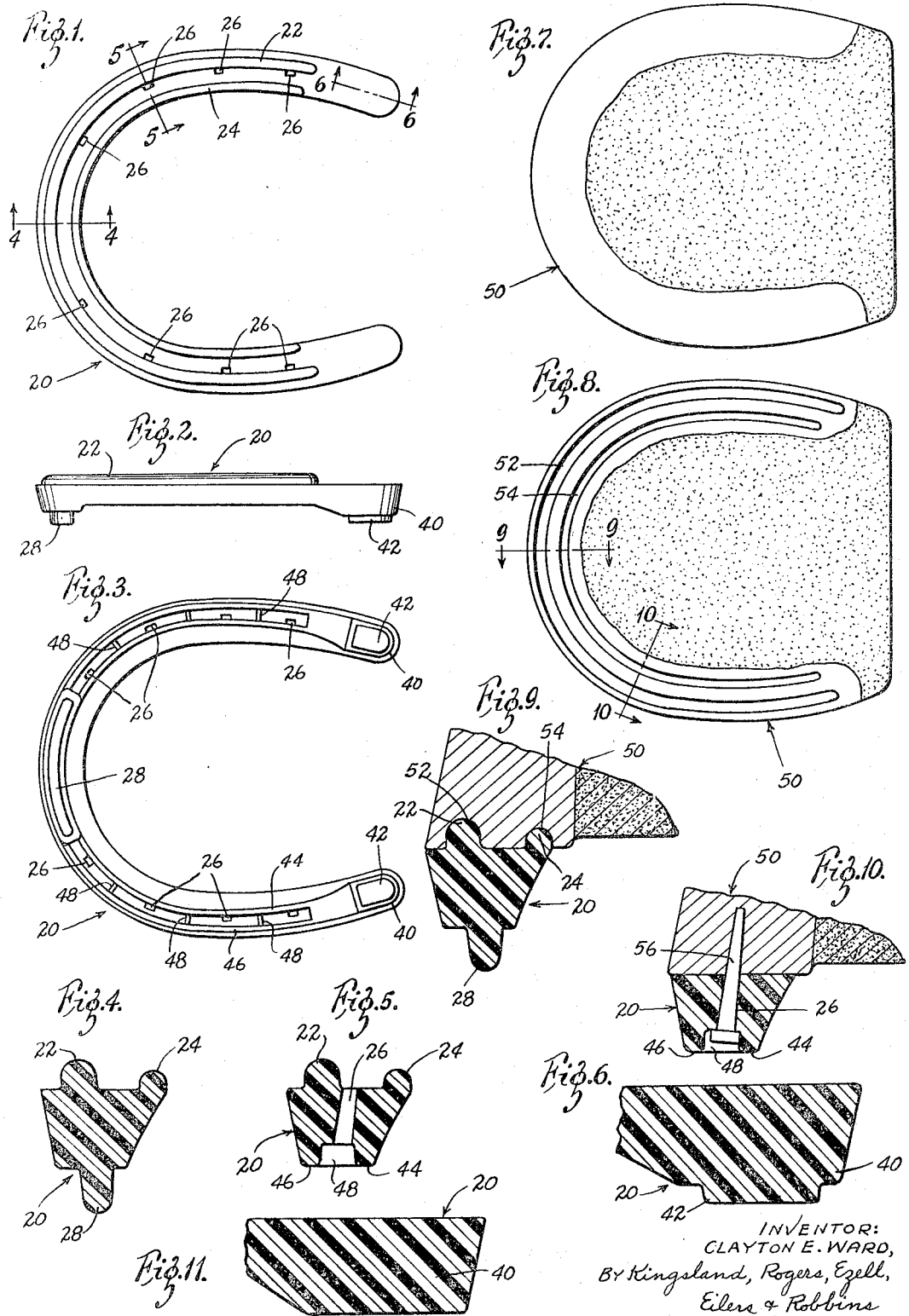

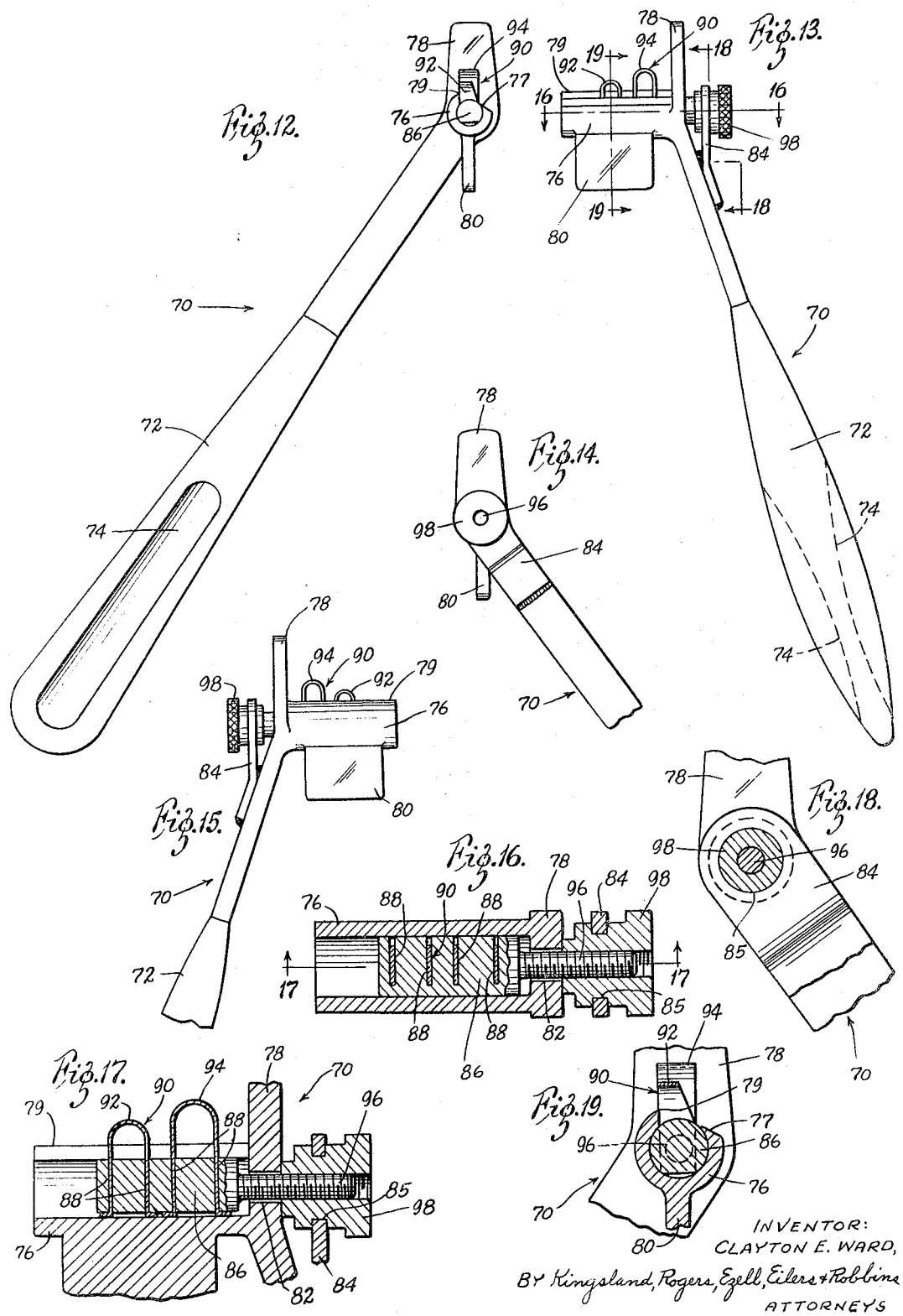

This invention relates to improvements in horseshoes. More particularly, this invention relates to improvements in horseshoes and in methods for securing same to horses' hooves.

It is, therefore, an object of the present invention to provide an improved horseshoe and an improved method and apparatus for securing same to a horse's hoof.

Most horseshoes in use today are made from iron or aluminum; and hence those horseshoes tend to be rigid and unyielding. Because they tend to be rigid and unyielding, those horseshoes tend to keep the hooves of the horses from expanding and contracting as the horses put their weight upon, and then subsequently lift, those hooves. The resulting curtailment of the expansion and contraction of the horses' hooves is very objectionable; because that expansion and contraction are needed to reduce the shocks and stresses which the hooves tend to transmit to the horses' ankles, knees and shoulders as the horses walk and run. Consequently, it would be desirable to provide a horseshoe that would permit a horse's hoof to expand and contract as the horse put its weight upon, and then subsequently lifted, its hoof.

Horseshoes that are made from a non-metallic, flexible material can permit the horses' hooves to expand and contract, and can thus tend to reduce the shocks and stresses which those hooves tend to transmit to the horses' ankles, knees and shoulders as the horses walk and run; but such horseshoes tend to spread, stretch, slip or turn relative to the horses' hooves and they also tend to break away from those hooves. As a result, while non-metallic, flexible horseshoes have been proposed, and while some non-metallic, flexible horseshoes have been made and used, non-metallic, flexible horseshoes have not come into general use.

When a horse puts his weight upon a horseshoe, the arms of that horseshoe tend to spread further apart. Where that horseshoe is made from metal, the rigid and unyielding nature of the material of that horseshoe greatly helps that horseshoe resist the forces which tend to spread the arms thereof further apart; but, where that horseshoe is made from a non-metallic, flexible material, the nails which secure the horseshoe to the horse's hoof must provide the primary resistance to the forces which tend to spread the arms of that horseshoe further apart. The resulting, sharply-increased stresses that are applied to those nails sharply increase the likelihood of a foot-to-sole separation, of cracking of the hoof, of loosening of the nails, of spreading, stretching, slipping and turning of the horseshoe relative to the hoof, and of cracking or breaking of the horseshoe. It would be desirable to provide a horseshoe which could be made from a non-metallic, flexible material, which could be readily secured to the hoof of a horse, and which would not sharply increase the stresses applied to the nails which are used to secure that horseshoe to that hoof. The present invention provides such a horseshoe; and it does so by providing the upper surface of a non-metallic, flexible horseshoe with at least one locking rib that will extend into a complementary locking groove in the horse's hoof. The interaction between that locking rib and that locking groove make it possible for that horseshoe to be made from non-metallic, flexible material without sharply increasing the stresses that the horse's weight will apply to the nails which are used to secure that horseshoe to that horse's hoof. It is, therefore, an object of the present invention to provide a non-metallic, flexible horseshoe with at least one locking rib on the upper surface thereof which will extend into a complementary locking groove in the hoof of a horse.

The provision of a horseshoe of non-metallic, flexible material with a locking rib on the upper surface thereof makes it possible to minimize the work that is required to conform the horseshoe to the horse's hoof. Where an iron or aluminum horseshoe does not initially conform to the shape of a horse's hoof, the horseshoer must use a hammer and anvil to re-shape that horseshoe so it will closely conform to the shape of that horse's hoof—using heat as well as the hammer and anvil where the horseshoe is made from iron. However, where the horseshoe is made from non-metallic, flexible material and has a locking rib on the upper surface thereof, the horseshoer does not have to use a hammer and anvil to re-shape that horseshoe so it will closely conform to the shape of the horse's hoof—instead, he can set that horseshoe against the hoof, use his hands to re-shape that horseshoe, and then rely upon that locking rib and the complementary locking groove in the horse's hoof to preserve the desired shape for that horseshoe. This means that it takes less work and less skill to make the non-metallic, flexible horseshoe of the present invention conform to the shape of a horse's hoof than it takes to make an iron or aluminum horseshoe conform to the shape of a horse's hoof.

The complementary, locking groove formed in the hoof of the horse disposes the locking rib of the horseshoe closer to the "quick" of the horse's foot than the rest of that horseshoe. If that horseshoe was made of metal, the formation of the locking groove in the horse's hoof and the disposition of the locking rib within that locking groove could be objectionable; because the metal of that shoe and of that locking rib would quickly raise the temperature within that locking groove to a value close to that of the bottom face of that horseshoe—and the temperature of that bottom face can become oppressively hot when the horse runs on a hot, dry track. However, because the horseshoe of the present invention and the locking rib thereon are made of non-metallic material, that horseshoe and that locking rib tend to keep the temperature within the locking groove below that temperature at the bottom face of the horseshoe when the horse is running.

When horses run on muddy tracks, mud and small particles of foreign matter tend to work their way into the the small spaces between the bottom faces of the horses' hooves and the upper faces of the horeshoes. That mud and those particles of foreign matter will tend to create local pressures, between the horses' hooves and the horseshoes; and the those local pressure could keep the horses from running as easily and as fast as they would otherwise run. It would be desirable to provide a horseshoe which could keep mud and small particles of foreign matter from working their way into the space between the horse's hoof and the horseshoe. The present invention provides such a horseshoe; and it does so by forming a sealing rib adjacent the inner edge of the upper face of that horseshoe which will extend into a complementary sealing groove in the horse's hoof. The sealing rib and the complementary sealing groove in the horse's hoof will coact with the locking rib and the complementary locking groove in the horse's hoof to keep mud or particles of foreign matter from working their way into the space between that hoof and the horseshoe. It is, therefore, an object of the present invention to provide a horseshoe with a sealing rib adjacent the inner edge of the upper face thereof and with a locking rib adjacent the outer edge of the uper face thereof which extend into complementary grooves in the horse's hoof to keep mud and particles of foreign matter from working their way itno the space between that hoof and that horseshoe.

Non-metallic, flexible horseshoes for both the front and rear hooves of horses can be made in accordance with the principles and teachings of the present invention. Where those horseshoes are made for the front hooves of horses, the lower faces of those horseshoes will be substantially flat except for toe grabs adjacent the closed ends of those horseshoes. However, where those horseshoes are made for the rear hooves of horses, the lower faces of those horseshoes will not only have toe grabs adjacent the closed ends thereof but will also have blocks adjacent the ends of the arms thereof. Each of those blocks has a projection of reduced size thereon which extends downwardly below the level of the bottom of that block and which will provide added gripping power for the shoe, where the horse must run on a very slippery track. Because the horseshoe and the blocks thereon are made from non-metallic material, the projections on those blocks can easily be rasped away; and this means that where the horse will run on a dry track, the projections on the blocks can easily be removed so those blocks will simulate blocks of standard design. As a result, a horse can be shod with horseshoes which will provide added gripping power, where that horse is to run on a very slippery track; and that horse can subsequently run on a dry track without having to have new horseshoes—the horseshoer merely rasping away the protections on the bottom faces of those blocks. It is, therefore, an object of the present invention to provide a non-metallic horseshoe with blocks thereon that have downwardly-extending projections of reduced cross section on the bottom faces thereof.

The complementary locking and sealing grooves in the horses' hooves are formed by a cutter which has a knife that forms those grooves as that cutter is moved around the outer surfaces of the hooves. That cutter has a guiding surface thereon which will bear against the outer surfaces of the horses' hooves, and that guiding surface will cause the complementary locking and sealing grooves to have configurations similar to those of those hooves. That cutter has a handle which will be gripped by the fingers of one of the horseshoer's hands, and it also has a pressure plate which can receive the thumb or a finger of the horseshoer's other hand. That handle, that pressure plate, and that guiding surface make it easy for the horseshoer to form complementary grooves of the desired configuration in the horses' hooves. It is, therefore, desirable to provide a cutter with a guiding surface thereon which will bear against the outer surfaces of the horses' hooves, with a handle which will be gripped by the fingers of one of the horseshoer's hands, and with a pressure plate which can receive the thumb or a finger of the horseshoer's other hand.

The knife of the cutter has sharp, U-shaped portions that extend into the horses' hooves to form the locking and sealing grooves in those hooves; and those U-shaped portions are spaced apart the same distance as the locking and sealing ribs on the upper surfaces of the horseshoes. However, that knife is mounted on a carrier which can be set at different distances from the guiding surface; and that carrier will be set at different distances from that guiding surface to properly position the locking and sealing grooves in the lower faces of the walls of the horses' hooves. It is, therefore, desirable to provide a cutter with a knife that has fixedly-spaced, sharp, U-shaped cutting portions and which mounts that knife on a carrier that can be set at different distances from the guiding surface of that cutter.

Other and further objects and advantages of the present invention should become apparent from an examination of the drawing and accompanying description.

In the drawing and accompanying description, preferred forms of the present invention are shown and described but it is to be understood that the drawing and accompanying description are for the purpose of illustration only and do not limit the invention and that the invention will be defined by the appended claims.

In the drawings:

FIG. 1 is a plane view of one preferred form of horseshoe that is made in accordance with the principles and teachings of the present invention, FIG. 2 is a side elevational view of the horseshoe shown in FIG. 1, FIG. 3 is a bottom view of the horseshoe shown in FIG. 1, FIG. 4 is a sectional view, on a larger scale, through the horseshoe of FIG. 1, and it is taken along the plane indicated by the line 4—4 in FIG. 1, FIG. 5 is a further sectional view, on the scale of FIG. 4, through the horseshoe of FIG.1, and it is taken along the plane indicated by the line 5—5 in FIG. 1, FIG. 6 is a still further sectional view, on the scale of FIG. 4, through the horseshoe of FIG. 1, and it is taken along the plane indicated by the line 6—6 in FIG.1, FIG. 7 is a schematic view of the bottom of the hoof of a horse, FIG. 8 is a schematic view of the hoof of FIG. 7 after a locking groove and a sealing groove have been formed in that hoof, FIG. 9 is a sectional view, on the scale of FIG. 4, through the hoof of FIG. 8 after the horseshoe of FIG. 1 has been nailed to that hoof, and it is taken along the plane indicated by the line 9—9 in FIG. 8, FIG. 10 is another sectional view, on the scale of FIG. 4, through the hoof of FIG. 8 after the horseshoe of FIG. 1 has been nailed to that hoof, and it is taken along the plane indicated by the line 10—10 in FIG. 8, FIG. 11 is a sectional view that is similar to the sectional view in FIG. 6, but it shows the block of the horseshoe after the projection on the bottom of that block has been removed, FIG. 12 is a side elevational view of one preferred form of cutter that is made in accordance with the principles and teachings of the present invention, FIG. 13 is a rear elevational view of the cutter of FIG. 12, FIG. 14 is a side elevational view of part of the cutter of FIG. 12 after that cutter has been rotated one hundred and eighty degrees about a vertical axis lying in the plane of the paper, FIG. 15 is a front elevational view of part of the cutter of FIG. 12, FIG. 16 is a partially-broken sectional view, on a larger scale, through the cutter of FIG. 12, and it is taken along the plane indicated by the line 16—16 in FIG. 13, FIG. 17 is a sectional view, on the scale of FIG. 16, through the cutter of FIG. 12, and it is taken along the plane indicated by the line 17—17 in FIG. 16, FIG. 18 is another sectional view, on the scale of FIG. 16, through the cutter of FIG. 12, and it is taken along the plane indicated by the line 18—18 in FIG. 13, and FIG. 19 is a still further sectional view, on the scale of FIG. 16, through the cutter of FIG. 12, and it is taken along the plane indicated by the line 19—19 in FIG. 13.

Referring to the drawing in detail, the numeral 20 generally denotes a rear horseshoe that is made of non-metallic, flexible material. That horseshoe can be made of hard rubber, synthetic rubber, nylon, Teflon, Mylar, or any of a number of tough and rugged plastic materials. That horseshoe has a locking rib 22 on the upper surface thereof, and that locking rib is spaced a short distance inwardly from the outer edge of that horseshoe. Further, that locking rib has a configuration that generally conforms to the configuration of that outer edge. A sealing rib 24 also is provided on the upper surface of the horseshoe 20, and that sealing rib is immediately adjacent the inner edge of that horseshoe. Furthermore, that sealing rib has a configuration which conforms to the configuration of that inner edge. As shown particularly by FIGS. 4, 5 and 9, the locking rib 22 is deeper and wider than the sealing rib 24. Also, as shown particularly by FIGS. 4, 5 and 9, the locking and sealing ribs 22 and 24 are U-shaped in cross section. In one preferred embodiment of the present invention, the locking rib 22 is three-sixteenths of an inch wide and three-sixteenths of an inch deep, the sealing rib 24 is five thirty-seconds of an inch wide and three thirty-seconds of an inch deep, and those ribs are spaced apart five thirty-seconds of an inch. The outer edge of the locking rib 22 is spaced three thirty-seconds of an inch from the outer edge of the upper surface of the horseshoe 20. The locking and sealing ribs 22 and 24 terminate well short of the free ends of the arms of the horseshoe 20.

The numeral 26 denotes passages which extends through the horseshoe 20 and which are usually located between the locking rib 22 and the sealing rib 24. In the particular embodiment of horseshoe shown, the passages 26 are located immediately adjacent the inner edges of the locking rib 22.

The numeral 28 denotes a toe grab which is formed on the undersurface of the horseshoe 20 adjacent the closed end of that horseshoe; and that toe grab extends downwardly from that undersurface. Blocks 40 are provided on the undersurfaces of the free ends of the arms of the horseshoe 20; and those blocks extend downwardly from those undersurfaces. The leading edges of the blocks 40 coact with the undersurfaces of the arms of the horseshoe to subtend large obtuse angles. As a result those leading edges of those blocks extend to and underlie those portions of the arms of the horseshoe 20 which are overlain by the locking rib 22. The numeral 42 denotes projections on the undersurfaces of the blocks 40; and those projections extend downwardly from those undersurfaces. Those projections are smaller in width and smaller in length than the blocks 40; and those projections provide added gripping power where the horses must run on very slippery tracks.

The numeral 44 denotes a ridge which is formed on the undersurface of the horseshoe 20 adjacent the inner edge of that horseshoe; and that ridge projects downwardly from that undersurface. That ridge extends from one of the blocks 40 to the toe grab 28, and then extends from that toe grab to the other block 40. The numeral 46 denotes a further ridge which is formed on the undersurface of the horseshoe 20, and that ridge is disposed adjacent the outer edge of that horseshoe. The ridge 46 projects downwardly from the undersurface of the horseshoe 20; and that ridge extends from one of the blocks 40 to the toe grab 28, and then extends from that toe grab to the other block 40. A number of webs 48 are formed on the undersurface of the horseshoe 20, and those webs extend between and are connected to the ridges 44 and 46. The webs 48 strengthen and reinforce the ridges 44 and 46, and that web coacts with those ridges to provide a series of recesses adjacent the passages 26. Those recesses will accommodate the heads of horseshoe nails 56 which extend through the passages 26 and seat in the wall of a horse's hoof 50 to secure the horseshoe 20 to that hoof. Absent the recesses formed by the ridges 44 and 46 and the webs 48, the heads of the nails 56 could project downwardly below the plane defined by the bottom of the horseshoe 20; and that would be undesirable.

The horseshoe 20 is intended for use on the rear hooves of horses. To make that horseshoe usable for the front hooves of horses, that horseshoe would be formed without the blocks 40 and without the projections 42 on those blocks. As a result, the ridges 44 and 46 and the toe grab 28 would define the bottom of the horseshoe 20, where that horseshoe is to be used for the front hooves of horses. Also, that horseshoe would be molded to have the configuration that is characteristic of the horseshoes for front hooves.

When the hoof 50 of a horse is to have a horseshoe 20 secured to it, the undersurface of the wall of that hoof will be rendered flat and smooth—in the same way in which the undersurfaces of the walls of horses' hooves are rendered flat and smooth before iron and aluminum horseshoes are secured to them. Thereafter, a locking groove 52 is formed in that undersurface of that wall of the hoof 50; and that locking groove is complementary to the locking rib 22 on the upper surface of the horseshoe 20. The numeral 54 denotes a sealing groove that is formed in the undersurface of the wall of the hoof 50; and that groove is complementary to the sealing rib 24 on the upper surface of the horseshoe 20. The locking groove 52 is three-sixteenths of an inch wide and three-sixteenths of an inch deep, the sealing groove 54 is five thirty-seconds of an inch wide and three thirty-seconds of an inch deep, and those grooves are spaced apart five thirty-seconds of an inch. As shown particularly by FIG. 9, the locking and sealing grooves 52 and 54 are U-shaped in cross section.

The locking groove 52 is spaced a short distance inwardly from the outer edge of the wall of the hoof 50; and the sealing groove 54 is spaced further inwardly from that outer edge. If the hooves of a horse are normal in configuration, and if the running habits of the horse do not need to be corrected, the locking and sealing grooves 52 and 54 will be formed so they are roughly parallel to the outer edges of the walls of those hooves. However, if any of those hooves are not normal in configuration, or if the running habits of the horse need to be corrected, the locking and sealing grooves 52 and 54 can be formed so they are inclined to, eccentric of, or unequally spaced from the outer edges of the walls of those hooves. The locking groove 52 and the sealing groove 54 are longer than the locking rib 22 and the sealing rib 24, but those grooves do not extend all the way to the rear ends of the wall of the hook 50. Instead, those grooves terminate short of those rear ends—as shown by FIG. 8.

The hooves of horses vary in width and in configuration; and, where horseshoes are made of metal, it is usually necessary to use a hammer and an anvil to re-shape those horseshoes to enable them to fit a horse's hooves. Where the horseshoes are made of iron, it is usually necessary to heat them to a red heat before using the hammer and anvil to re-shape them. All need of using a hammer and anvil is eliminated where the horseshoe is made in accordance with the principles and teachings of the present invention; because the horseshoe 20 is made of flexible material so that horseshoe can be re-shaped by the horseshoer's hands, and because the locking rib 22 on that horseshoe will interact with the locking groove 52 in the hoof 50 to hold that horseshoe in the desired shape. Specifically, if the horseshoe 20 does not initially fit the curvature of the hoof 50, the horseshoer will move the free ends of that horseshoe toward or away from each other until the locking rib 22 is aligned with the locking groove 52, and then he will press the upper face of the horseshoe 20 against the grooved bottom face of the hoof 50. Once the locking rib 22 has been set within the locking groove 52 and the sealing rib 24 has been set within the sealing groove 54, horseshoe nails 56 can be inserted within the passages 26 and then hammered into the horse's hoof 50. The material of which the horseshoe 20 is made is sufficiently flexible to enable the free ends of the horseshoe to be moved apart as much as one-quarter of an inch or to be moved toward each other as much as one-quarter of an inch. In addition, the horseshoe 20 will be made in half sizes from size three through size seven.

Once the locking rib 22 has been set within the locking groove 52, the sealing rib 24 has been set within the sealing groove 54, and the horseshoe nails 56 have been driven into the horse's hoof 50, the engagement between locking rib 22 and locking groove 52 will largely free those portions of the horseshoe 20 which define the passages 26 from laterally-directed stresses and strains. This is very important, because laterally-directed stresses and strains applied to those portions of the horseshoe 20 could lead to spreading, stretching, slipping or turning of that horseshoe relative to the hoof 50, and could lead to breaking of that horseshoe. However, because the portions of the horseshoe 20 adjacent the passages 26 are kept largely free from laterally-directed stresses and strains, that horseshoe is kept from spreading, stretching, slipping or turning relative to the hoof 50, and is kept from breaking.

The locking rib 22 and the locking groove 52 provide more resistance to lateral displacement of the horseshoe 20 than do the sealing rib 24 and the sealing groove 54. However, that sealing rib and that sealing groove do provide resistance to lateral displacement of the horseshoe 20. Also, the locking rib 22 and the locking groove 52 provide a sealing action against mud and particles of foreign matter which tend to enter the small space between the horseshoe 20 and the hoof 50.

In the event a horse, fitted with horseshoe 20, is to run on a dry track, the horseshoer can easily rasp away the projections 42 on the blocks 40. However, if that horse is to run on a very slippery track, the projections 42 will be left intact. If a horse is shod with horseshoes 20 shortly before that horse is to run on a very slippery track, and if that horse must subsequently run on a dry track, the horseshoer can easily rasp away the projections 42 before that horse runs on that dry track.

The horseshoes 20 can be made of differently-colored non-metallic material. Where desired, those horseshoes can be colored to match the colors of the stable having its horses shod with those horseshoes.

The locking groove 52 and the sealing groove 54 are readily formed by a cutter which is generally denoted by the numeral 70. That cutter has a handle 72, and that handle has shallow, concave recesses 74 therein. The handle 72 is readily gripped by either of the horseshoer's hands, and the fingers of that hand will rest in one or the other of the shallow, concave recesses 74.

A holding cylinder 76 is provided adjacent that end of the cutter 70 which is remote from the handle 72; and one side of that holding cylinder is open, as shown particularly by FIG. 19. The trailing edge of the open side of the holding cylinder 76 is denoted by the numeral 77; and that trailing edge is displaced vertically as well as horizontally from the leading edge 79 of that open side. The displacement of the trailing edge 77 relative to the leading edge 79 of the open side of the holding cylinder 76 is important because it facilitates easy and uninterrupted discharge of those portions of the hoof 50 that are cut away as the locking groove 52 and the sealing groove 54 are formed. When the cutter 70 is in use, the handle 72 will be up and the holding cylinder 76 will be down; and the displacement of the trailing edge 77 of the open side of the holding cylinder 76 relative to the leading edge 79 of that holding cylinder will enable that trailing edge to serve as a fulcrum. Specifically, the displacement of that leading edge relative to that trailing edge will enable that trailing edge to serve as a fulcrum when the cutter 70 is rocked to raise the knife 90 upwardly and away from the hoof 50 and thereby termintae the locking and sealing grooves 52 and 54.

A guiding surface 78 extends beyond the holding cylinder 76; and that guiding surface will engage the outer surface of the wall of the hoof 50. In the preferred embodiment of cutter shown, the guiding surface 78 is at right angles to the axis of the holding cylinder 76.

A pressure plate 80 extends from the closed side of the holding cylinder 76; and, when the cutter 70 is in use, that pressure plate will extend upwardly from the holding cylinder 76. That pressure plate and the handle 72 subtend an angle of about thirty degrees; and that angle is important, because it enables that pressure plate to be set perpendicular to the direction of movement of the cutter 70 while that handle can apply a sizable component of force in that direction and can also apply a sizable component of force at right angles to that direction—the latter component of force holding the knife 90 in the wall of the hoof 50. It should also be noted that the pressure plate 80 extends generally radially of the leading edge 79 of the open side of the holding cylinder 76; and this is important because that leading edge is the hoof-engaging portion of that holding cylinder. As a result, a horseshoer can set the cutter 70 so the pressure plate 80 extends outwardly from the bottom of the wall of the hoof 50 at ninety degrees, can grip the handle 72 with one hand, and can press the thumb or finger of his other hand against the pressure plate 80 and automatically set the knife 90 at its optimum cutting angle.

The numeral 82 denotes a passage through the guiding surface 78, and that passage extends into the interior of the holding cylinder 76. A bracket 84 is secured to the outer face of the cutter 70; and that bracket has a large opening 85 therein, as shown particularly by FIGS. 16 and 17. That large opening is in register with the passage 82 in the guiding surface 78.

A carrier 86 is dimensioned so its fits snugly within the holding cylinder 76. That carrier is generally cylindrical in configuration, but it has one side thereof flattened, as by a milling operation. A number of slots 88 are formed in the carrier 86, and those slots extend to the forward face of that carrier, as shown by FIG. 16. Those slots are set at ninety degrees to the flattened side of that carrier, and they also are set at ninety degrees to the axis of that carrier.

Those slots accommodate the sides of generally U-shaped portions 92 and 94 of the knife 90. The closed ends of the portions 92 and 94 have the leading edges thereof sharpened to serve as cutting edges for the knife 90. The adjacent arms of the U-shaped portions 92 and 94 are connected together, and the outer arms of those U-shaped portions have flanges which extend away from the adjacent arms of those U-shaped portions. The flanges on the outer arms of the U-shaped portions 92 and 94 and the connecting portion between the adjacent arms of those U-shaped portions abut the flattened face of the carrier 86. When that carrier is disposed within the holding cylinder 76, the flanges and the connecting portion of the knife 90 fit snugly within the space between the inner surface of that cylinder and the flattened face of that carrier. The engagements between those flanges and that connecting portion and the interior of the holding cylinder 76 are intimate enough to prevent tilting of the knife 90 relative to that holding cylinder.

The carrier 86 has a threaded shank 96, and that shank is dimensioned to extend through the passage 82 in the guiding surface 78. That threaded shank extends through and beyond the opening 85 in the bracket 84; and a knurled nut 98 has a threaded opening therethrough which mates with that threaded shank. As shown by the drawing, the knurled nut 98 has an annular groove which is accommodated and held by the large opening 85 in the bracket 84. However, in production, the knurled nut 98 will have a reduced-diameter portion that will fit easily within the large diameter opening 85, will have an annular groove in that reduced-diameter portion that will be disposed inwardly of the bracket 84, and will have a suitable fastener, such as a C-washer, set in that annular groove to prevent accidental separation of that knurled nut from that bracket. Rotation of the knurled nut 98 relative to the holding cylinder 76 will cause movement of the carrier 86, and hence of the knife 90, axially of that holding cylinder. Such axial movement will effect adjustment of the spacing between the U-shaped cutting portions 92 and 94 and the hoof-engaging portion of the guiding surface 78. That adjustment is important; because the hooves of horses vary, and the setting of the carrier 86 will usually be changed from hoof to hoof. As a matter of fact, where a hoof has an unusual configuration or where the horse needs a corretcion in its running habits, the horseshoer may adjust the spacing between the guiding surface 78 and the U-shaped cutting portions 92 and 94 more than once during the grooving of one hoof.

Where desired, the knurled nut 98 can be rotated far enough to free the threaded shank 96 of the carirer 86 from that knurled nut. This will be done whenever the knife 90 has become dulled through use and must be replaced by a sharp knife 90. To replace a dulled knife 90, it is only necessary to rotate the knurled nut 98 far enough to free the threaded shank 96 on the carrier 86, to remove that carrier from the holding cylinder 76, to press the dulled knife 90 out of the grooves 88, to press the sharp knife 90 into those grooves, to re-insert the carrier 86 into the holding cylinder 76, and to rotate the knurled nut 98 in the opposite direction until the desired spacing is attained between the U-shaped cutting portions 92 and 94 and the guiding surface 78.

In using the cutter 70, the horseshoer initially cuts or rasps the bottom of the wall of the horse's hoof to make that bottom smooth. He then checks the thickness and configuration of that wall, and also ascertains whether the horse needs a correction in its running habits; because these various factors will affect his determination of the orientation and placement of the locking and sealing grooves 52 and 54. Once he has decided upon the orientation and placement of the locking and sealing grooves 52 and 54 the horseshoer will rotate the knurled nut 98 until the desired spacing is attained between the guiding surface 78 and the U-shaped cuting portions 92 and 94 of the knife 90.

Thereafter, the horseshoer will set the guiding surface 78 in engagement with the outer surface of the wall of the hoof, and will set the sharp edges of the U-shaped cutting portions 92 and 94 against the bottom of that wall. At first, the horseshoer will tilt the handle 72 so the leading face of the pressure plate 80 will coact with the bottom surface of the wall of the hoof to subtend an acute angle—thereby inclining the closed ends of the U-shaped cutting portions 92 and 94 of knife 90 downwardly toward that bottom surface. The horseshoer will then apply forces to the handle 72 and to the pressure plate 80 to start forming portions of the locking and sealing grooves 52 and 54. The leading edge 79 of the open side of the holding cylinder 76 will quickly engage the bottom of the wall of the hoof and will automatically limit the depth of the locking and sealing grooves 52 and 54. Once that leading edge engages that bottom of that wall, the horseshoer will tilt the handle 72 until the pressure plate 80 is at ninety degrees to the plane defined by that bottom. Thereafter, as long as the horseshoer keeps that pressure plate at ninety degrees to the plane defined by that bottom, the closed ends of the U-shaped portions 92 and 94 of the knife 90 will be set at their optimum cutting angles.

As the cutter 70 is moved relative to the hoof 50, the portions of the hoof that are removed in the formation of the locking and sealing grooves 52 and 54 in that hoof will pass between the legs of the U-shaped portions 92 and 94 of the knife 90 and then pass beneath the trailing edge 77 of the holding cylinder 76. The rear edge of the U-shaped portion 92 is cut-away, as shown particularly by FIG. 19, to facilitate the passage through that U-shaped portion of the material removed from the hoof during the forming of the sealing groove 54. The displacement of the trailing edge 77 from the leading edge 79 of the holding cylinder 76 is great enough to permit free passage of removed material under that trailing edge.

If the horse's hoof has a configuration and a wall thickness that are ideal, the locking and sealing grooves 52 and 54 can be formed without requiring any further adjustment of the position of the cutter 86. However, as is frequently the case, some portions of the lengths of those grooves will be formed with one setting of the carrier 86, while other portions of the lengths of those grooves will be formed with one or more different settings of that carrier. Where different portions of the lengths of the locking and sealing gooves 52 and 54 are formed with different settings of the carried 86, the handle 72 will be tilted in one direction to guide the U-shaped cutting portions 92 and 94 of knife 90 upwardly away from the hoof wall, as the cutter 70 completes the forming of a desired length of the locking and sealing grooves 52 and 54; and that handle will be tilted in the opposite direction to guide the U-shaped cutting portions 92 and 94 of knife 90 downwardly into the hoof wall, as the cutter 70 starts a further length of the locking and sealing grooves 52 and 54. As the handle 72 is tilted in the said one direction, the trailing edge 77 of the open side of the holding cylinder 76 will serve as a fulcrum to facilitate the guiding of the U-shaped cutting portions 92 and 94 of knife 90 upwardly relative to the hoof wall.

The locking groove 52 is deeper than the sealing groove 54, but that locking groove is spaced further from the "quick" of the horse's hoof than is that sealing groove. Consequently, no injury is done to the horse, and the horse feels no pain, as the locking and sealing grooves 52 and 54 are formed.

Once the locking and sealing grooves 52 and 54 have been formed, the locking and sealing ribs 22 and 24 of the horseshoe 20 are pressed into those grooves. The nails 56 are then passed through the passages 26 in the horseshoe 20 and are driven into the wall of the hoof 50. Thereupon, the horseshoer will rasp the lower portion of the outer surface of the wall of the hoof 50 until that lower portion has the configuration of the outer edge of the upper face of the horseshoe 20.

The non-metallic horseshoe provided by the present invention is shown as having just two ribs on the upper face thereof; and two ribs are desirable with the relatively thin-walled hooves of thoroughbreds. However, where the non-metallic horseshoes of the present invention are to be used on horses with thicker-walled hooves, three ribs will preferably be provided on the upper faces of those horseshoes. The two utermost ribs on a three-rib horseshoe will serve as locking ribs and the innermost rib on such a horseshoe will serve as a sealing rib. Where three ribs are provided on the upper face of a horseshoe, the outermost rib and the inermost rib will have the dimensions, but not the spacing, of the locking and sealing ribs 22 and 24. The middle rib will preferably be nine sixty-fourths of an inch wide and nine sixty-fourths of an inch deep; and it will preferably be spaced midway between the locking and sealing ribs 22 and 24.

Where three ribs are provided on the upper face of a horseshoe, the cutter 70 will have a carrier with six slots in it, and the knife held by that carrier will have three U-shaped cutting portions. All that is needed to adapt the cutter 70 to the forming of three grooves in the hoof of a horse is the replacement of the carrier 86 and the knife 90 with a carrier and knife that will effect the formation of three grooves rather than just two grooves.

The ribs on the upper surface of the horseshoe 20 reinforce and strengthen that horseshoe; but those ribs do not make that horseshoe rigid and unyielding. As a result, the horseshoes provided by the present invention are sturdy and tough but are readily re-shaped by hand.

The elongated leading edges of the blocks 40 extend forwardly of the rear ends of the locking rib 22. As a result, those leading edges help reinforce the free ends of the arms of the horseshoe. However, the blocks 40 and the elongated leading edges thereof do not make the horseshoe 20 rigid and unyielding.

It will be noted that the cutter 70 does not require any batteries or attached wires. As a result, that cutter is small and compact and is easily and freely handled. Furthermore, because the knife 90 is un-heated, the cutter 70 does not make noises which could unsettle or alarm the horse that is being shod.

The grooving of a hoof is so easily and simply accomplished that the total time required to shoe a horse with four horseshoes 20 is usualy just slightly longer than the total time required to secure four properly-sized metal shoes to a horse's hooves. Where the metal shoes have to be re-shaped, it is quicker to use the horseshoes 20 of the present invention.

Whereas the drawing and accompanying description have shown and described preferred embodiments of the present invention, it should be apparent to those skilled in the art that various changes may be made in the form of the invention without affecting the scope thereof.

What I claim is:

1. A non-metallic, flexible horseshoe which has:
   (a) an upstanding locking rib on the upper surface thereof,
   (b) said locking rib being adjacent to, but being spaced inwardly of, the outer edge of said horseshoe,
   (c) said lockibng rib being generally parallel to said outer edge of said horseshoe,
   (d) said locking rib being generally U-shaped in transverse cross section and having the rounded surface thereof disposed above the level of said upper surface of said horseshoe,
   (e) an upstanding sealing rib on said supper surface of said horseshoe,
   (f) said sealing rib being adjacent to the inner edge of said horseshoe,
   (g) said sealing rib being generally parallel to said inner edge of said horseshoe,
   (h) said sealing rib being generally U-shaped in transverse cross section and having the rounded surface thereof disposed above the level of said upper surface of said horseshoe,
   (i) said locking rib being spaced outwardly of said sealing rib to define a generally flat space therebetween,
   (j) said locking rib having the rear ends thereof disposed forwardly of the rear ends of the arms of said horseshoe,
   (k) said sealing rib having the rear ends thereof disposed forwardly of the rear ends of the arms of said horseshoe and also disposed forwardly of said rear ends of said locking rib,
   (l) a toe grab on said horseshoe that is adjacent the closed end of said horseshoe and that extends downwardly from the lower surface of said horseshoe,
   (m) blocks on said rear ends of said arms of said horseshoe that extend downwardly from said lower surface of said horseshoe,
   (n) said blocks having tapered leading edges that extend forwardly and that underlie the rear ends of said locking rib, and
   (o) nail-receiving passages in said horseshoe,
   (p) projections on the undersurfaces of said blocks that extend downwardly from said undersurfaces of said blocks,
   (q) said projections being narrower and shorter than said undersurfaces of said blocks,
   (r) said locking rib being wider and higher than said sealing rib,
   (s) said projections on said undersurfaces of said blocks being readily removed by a rasp,
   (t) whereby said horseshoe can be used initially on a very slippery track band subsequently used on a dry track.

2. A non-metallic, flexible horseshoe which has:
   (a) an upstanding locking rib on the upper surface thereof,
   (b) said locking rib being adjacent to, but being spaced inwardly of, the outer edge of said horseshoe,
   (c) said locking rib being generally parallel to said outer edge of said horseshoe,
   (d) said locking rib being generally U-shaped in transverse cross section and having the rounded surface thereof disposed above the level of said upper surface of said horseshoe,
   (e) an upstanding sealing rib on said upper surface of said horseshoe,
   (f) said sealing rib being adjacent to the inner edge of said horseshoe,
   (g) said sealing rib being generally parallel to said inner edge of said horseshoe,
   (h) said sealing rib being generally U-shaped in transverse cross section and having the rounded surface thereof disposed above the level of said upper surface of said horseshoe,
   (i) said locking rib being spaced outwardly of said sealing rib to define a generally flat space therebetween,
   (j) said locking rib having the rear ends thereof disposed forwardly of the rear ends of the arms of said horseshoe,
   (k) said sealing rib having the rear ends thereof disposed forwardly of the rear ends of the arms of said horseshoe and also disposed forwardly of said rear ends of said locking rib,
   (l) a toe grab on said horseshoe that is adjacent the closed end of said horseshoe and that extends downwardly from the lower surface of said horseshoe, and
   (m) nail-receiving passages in said horseshoe,
   (n) said locking rib being wider and higher than said sealing rib.

3. A non-metallic, flexible horseshoe which has:
   (a) an upstanding locking rib on the upper surface thereof,
   (b) an upstanding sealing rib on said upper surface of said horseshoe, and
   (c) nail-receiving passages in said horseshoe,
   (d) said locking rib being adapted to extend within a complementary locking groove within a horse's hoof,
   (e) said sealing rib being adapted to extend within a complementary sealing groove in said horse's hoof,
   (f) said locking rib on said upper surface of said horseshoe fitting within, and coacting with, said locking groove in said hoof to minimize the laterally-directed forces on horseshoe nails in said nail-receiving passages,
   (g) said sealing rib on said upper surface of said horseshoe fitting within, and coacting with, said sealing groove in said hoof to resist the entry of mud and particles of foreign matter into the space between said horseshoe and said hoof,
   (h) said locking rib on said upper surface of said horseshoe fitting within, and coacting with, said locking groove in said hoof to resist the entry of mud and particles of foreign matter into the space between said horseshoe and said hoof,
   (i) said sealing rib on said upper surface of said horseshoe fitting within, and coacting with, said sealing groove in said hoof to minimize the laterally-directed forces on horseshoe nails in said nail-receiving passages,
   (j) said locking rib being adjacent to, but being spaced inwardly of, the outer edge of said horseshoe,
   (k) said locking rib being generally parallel to said outer edge of said horseshoe,
   (l) said sealing rib being adjacent to the inner edge of said horseshoe,
   (m) said sealing rib being generally parallel to said inner edge of said horseshoe,
   (n) said locking rib being spaced outwardly of said sealing rib to define a generally flat space therebetween,
   (o) said locking rib being wider and higher than said sealing rib.

4. A non-metallic, flexible horseshoe which has:
(a) an upstanding locking rib on the upper surface thereof,
(b) an upstanding sealing rib on said upper surface of said horseshoe, and
(c) nail-receiving passages in said horseshoe,
(d) said locking rib being adapted to extend within a pre-formed complementary locking groove in a horse's hoof,
(e) said sealing rib being adapted to extend within a pre-formed complementary sealing groove in said horse's hoof,
(f) said locking rib on said upper surfaces of said horseshoe fitting within, and coacting with, said locking groove in said hoof, as soon as said horseshoe is nailed to said hoof, to minimize the laterally-directed forces on horseshoe nails in said nail-receiving passages,
(g) said sealing rib on said upper surface of said horseshoe fitting within, and coacting with, said sealing groove in said hoof, as soon as said horseshoe is nailed to said hoof, to resist the entry of mud and particles of foreign matter into the space between said horseshoe and said hoof,
(h) said locking rib on said upper surface of said horseshoe fitting within, and coacting with, said locking groove in said hoof, as soon as said horseshoe is nailed to said hoof, to resist the entry of mud and particles of foreign matter into the space between said horseshoe and said hoof,
(i) said sealing rib on said upper surface of said horseshoe fitting within, and coacting with, said sealing groove in said hoof, as soon as said horseshoe is nailed to said hoof, to minimize the laterally-directed forces on horseshoe nails in said nail-receiving passages,
(j) said locking rib being adjacent to, but being spaced inwardly of, the outer edge of said horseshoe,
(k) said locking rib being generally parallel to said outer edge of said horseshoe, and having a configuration in plan that generally conforms to the configuration in plan of said horseshoe,
(l) said sealing rib being adjacent to the inner edge of said horseshoe,
(m) said sealing rib being generally parallel to said inner edge of said horseshoe, and having a configuration in plan that generally conforms to the configuration in plan of said horseshoe,
(n) said locking rib and said rib stiffening said horseshoe along lines generally parallel to the center line of said horseshoe.

5. A non-metallic, flexible horseshoe which has:
(a) an upstanding locking rib on the upper surface thereof,
(b) an upstanding sealing rib on said upper surface of said horseshoe, and
(c) nail-receiving passages in said horseshoe,
(d) said locking rib being adapted to extend within a pre-formed complementary locking groove in a horse's hoof,
(e) said sealing rib being adapted to extend within a pre-formed complementary sealing groove in said horse's hoof,
(f) said locking rib on said upper surface of said horseshoe fitting within, and coacting with, said locking grooves in said hoof, as soon as said horseshoe is nailed to said hoof, to minimize the laterally-directed forces on horseshoe nails in said nail-receiving passages,
(g) said sealing rib on said upper surface of said horseshoe fitting within, and coacting with, said sealing groove in said hoof, as soon as said horseshoe is nailed to said hoof, to resist the entry of mud and particles of foreign matter into the space between said horseshoe and said hoof,
(h) said locking rib on said upper surface of said horseshoe fitting within, and coacting with, said locking groove in said hoof, as soon as said horseshoe is nailed to said hoof, to resist the entry of mud and particles of foreign matter into the space between said horseshoe and said hoof,
(i) said sealing rib on said upper surface of said horseshoe fitting within, and coacting with, said sealing groove in said hoof, as soon as said horseshoe is nailed to said hoof, to minimize the laterally-directed forces on horseshoe nails in said nail-receiving passages,
(j) said locking rib being generally U-shaped in transverse cross section and having the rounded surface thereof disposed above the level of said upper surface of said horseshoe,
(k) said sealing rib being generally U-shaped in transverse cross section and having the rounded surface thereof disposed above the level of said upper surface of said horseshoe,
(l) said locking rib being wider and higher than said sealing rib,
(m) said locking rib and said sealing rib having configurations in plan that generally conform to the configuration in plan of said horseshoe,
(n) said locking rib and said sealing rib stiffening said horseshoe along lines generally parallel to the center line of said horseshoe.

6. A non-metallic, flexible horseshoe which has:
(a) an upstanding rib on the upper surface thereof, and
(b) nail-receiving passages in said horseshoe,
(c) said rib being adapted to extend within a pre-formed complementary groove in a horse's hoof,
(d) said rib on said upper surface of said horseshoe fitting within, and coacting with, said groove in said hoof, as soon as said horseshoe is nailed to said hoof, to minimize the laterally-directed forces on horseshoe nails in said nail-receiving passages,
(e) said rib on said upper surface of said horseshoe fitting within, and coacting with, said groove in said hoof, as soon as said horseshoe is nailed to said hoof, to resist the entry of mud and particles of foreign matter into the space between said horseshoe and said hoof,
(f) said rib having the rear ends thereof disposed forwardly of the rear ends of the arms of said horseshoe,
(g) said rib having a configuration in plan that generally conforms to the configuration in plan of said horseshoe,
(h) said rib constituting a means for stiffening said horseshoe along a line generally parallel to the center line of said horseshoe.

7. A non-metallic, flexible horseshoe which has:
(a) an upstanding locking rib on the upper surface thereof,
(b) an upstanding sealing rib on said upper surface of said horseshoe, and
(c) nail-receiving passages in said horseshoe,
(d) said locking rib being adapted to extend within a pre-formed complementary locking groove in a horse's hoof,
(e) said sealing rib being adapted to extend within a pre-formed complementary sealing groove in said horse's hoof,
(f) said locking rib on said upper surface of said horseshoe fitting within, and coacting with, said locking groove in said hoof, as soon as said horseshoe is nailed to said hoof, to minimize the laterally-directed forces on horseshoe nails in said nail-receiving passages,
(g) said sealing rib on said upper surface of said horseshoe fitting within, and coacting with, said sealing groove in said hoof, as soon as said horseshoe is nailed to said hoof, to resist the entry of mud and particles of foreign matter into the space between said horseshoe and said hoof,
(h) said locking rib on said upper surface of said horseshoe fitting within, and coacting with, said locking groove in said hoof, as soon as said horseshoe is nailed to said hoof, to resist the entry of mud and particles of foreign matter into the space between said horseshoe and said hoof,
(i) said sealing rib on said upper surface of said horseshoe fitting within, and coacting with, said sealing groove in said hoof, as soon as said horseshoe is nailed to said hoof, to minimize the laterally-directed forces on horseshoe nails in said nail-receiving passages,
(j) said locking rib and said sealing rib having configurations in plan that generally conform to the configuration in plan of said horseshoe,
(k) said locking rib and said sealing rib constituting a means for stiffening said horseshoe along lines generally parallel to the center line of said horseshoe.

8. A non-metallic, flexible horseshoe that has:
(a) blocks on the rear ends of the arms thereof that extend downwardly from the under surface of said horseshoe,
(b) projections on the undersurfaces of said blocks that extend downwardly from said undersurfaces of said blocks,
(c) said projections being narrower and shorter than said undersurfaces of said blocks,
(d) said projections on said undersurfaces of said blocks being readily removed by a rasp,
(e) whereby said horseshoe can be used initially on a very slippery track and subsequently used on a dry track, and
(f) an upstanding rib on the upper surface of said horseshoe, spaced from and extending along the outer edge of said horseshoe surface,
(g) said rib being adapted to extend within a preformed complementary groove in a horse's hoof,
(h) said rib and said groove coacting, as soon as said horseshoe is nailed to said hoof, to minimize the laterally-directed forces on horseshoe nails in nail-receiving passages in said horseshoe,
(i) said blocks, said projections, and said ribs being molded integrally with said horseshoe.

9. A non-metallic, flexible horseshoe that has:
(a) blocks on the rear ends of the arms thereof that extend downwardly from the undersurface of said horseshoe,
(b) projections on the undersurfaces of said blocks that extend downwardly from said undersurfaces of said blocks,
(c) said projection on said undersurfaces of said blocks being readily removed by a rasp, and
(d) an upstanding rib on the upper surface of said horseshoe substantially extending around the length of the horseshoe,
(e) said rib being adapted to extend within a preformed complementary groove in a horse's hoof,
(f) said rib and said groove constituting a means to minimize the laterally-directed forces on horseshoe nails in nail-receiving passages in said horseshoe,
(g) said blocks, said projections, and said ribs being molded integrally with said horseshoe.

10. The method of shoeing a horse which comprises:
(a) forming a groove in the bottom surface of the wall of a hoof of said horse,
(b) said groove being generally U-shaped in transverse section,
(c) terminating said groove short of the rear ends of said wall of said hoof,
(d) forming said groove so it generally conforms to the outer surface of said wall of said hoof,
(e) said groove being spaced inwardly from said outer surface of said hoof,
(f) forming a second groove in said bottom surface of said wall of said hoof,
(g) said second groove being generally U-shaped in transverse section,
(h) terminating said second groove short of the rear ends of said wall of said hoof,
(i) forming said second groove so it generally conforms to the inner surface of said wall of said hoof,
(j) said second groove being spaced inwardly from said inner surface of said hoof,
(k) selecting a flexible horseshoe with a pair of upstanding ribs on the upper surface thereof,
(l) said ribs on said upper surface of said horseshoe being shorter than said grooves in said hoof,
(m) disposing said horseshoe so said ribs on said upper surface thereof are within said grooves in said bottom surface of said wall of said hoof, and
(n) nailing said horseshoe to said wall of said hoof while holding said ribs on said upper surface of said horseshoe within said grooves in said bottom surface of said wall of said hoof,
(o) said ribs on said upper surface of said horseshoe and said grooves in said bottom surface of said wall of said hoof thereafter interacting to largely relieve said nails from laterally-directed forces.

11. The method of shoeing a horse which comprises:
(a) forming a groove in the bottom surface of the wall of a hoof of said horse,
(b) forming said groove so it generally conforms to the outer surface of said wall of said hoof,
(c) selecting a flexible horseshoe with an upstanding rib on the upper surface thereof,
(d) disposing said horseshoe so said rib on said upper surface thereof is within said groove in said bottom surface of said wall of said hoof, and
(e) nailing said horseshoe to said wall of said hoof while holding said rib on said upper surface of said horseshoe within said groove in said bottom surface of said wall of said hoof,
(f) said rib on said upper surface of said horseshoe and said groove in said bottom surface of said wall of said hoof thereafter interacting to largely relieve said nails from laterally-directed forces.

12. A non-metallic flexible horseshoe which has:
(a) an upstanding rib on the upper surface thereof, and
(b) nail-receiving passages in said horseshoe,
(c) said rib being adapted to extend within a preformed complementary groove in a horse's hoof,
(d) said rib on said upper surface of said horseshoe fitting within, and coacting with, said groove in said hoof, as soon as said horseshoe is nailed to said hoof, to minimize the laterally-directed forces on horseshoe nails in said nail-receiving passages,
(e) said rib being molded integrally with said horseshoe,
(f) said rib having displacement-resisting surfaces at the opposite sides thereof that can engage complementary displacement-resisting surfaces at the opposite sides of said pre-formed groove in said hoof,
(g) said rib having a configuration in plan that generally conforms to the configuration in plan of said horseshoe,
(h) said rib extending along the major portion of each of the arms of said horseshoe and also extending along the major portion of the closed end of said horseshoe to increase the resistance of said horseshoe to twisting forces,
(i) said rib constituting a means for stiffening said horseshoe along a line that is generally parallel to the center line of said horseshoe,
(j) said displacement-resisting surfaces at the opposite sides of said rib and said complementary displacement-resisting surfaces at the opposite sides of said pre-formed groove in said hoof coacting with the extending of said rib along the major portion of the length of each of said arms of said horseshoe and along the major portion of the length of the closed end of said horseshoe to substantially hold said horseshoe, as soon as said horseshoe is nailed to said hoof, against displacement in any direction in a plane parallel to the bottom surface of said hoof.

References Cited by the Examiner

UNITED STATES PATENTS

| | | | |
|---|---|---|---|
| 124,804 | 3/1872 | Foust | 168—48 |
| 142,097 | 8/1873 | Goodenough | 168—4 |
| 195,222 | 9/1877 | Mervesp | 168—36 |
| 207,905 | 9/1878 | Smith | 168—4 |
| 217,642 | 7/1879 | Schaefer | 168—48 |
| 649,738 | 5/1900 | Maxwell | 168—48 |
| 843,907 | 2/1907 | O'Brien | 168—17 X |
| 932,671 | 8/1909 | Bates | 168—48 |
| 1,141,726 | 6/1915 | Ryan | 168—31 |
| 1,338,584 | 4/1920 | Paar | 168—15 |
| 2,024,265 | 12/1935 | Anderson et al. | 168—4 |
| 2,197,166 | 4/1940 | Wheeler et al. | 168—4 |
| 2,705,536 | 4/1955 | Phreaner | 168—14 |
| 3,050,133 | 8/1962 | Kitner et al. | 168—31 X |

SAMUEL KOREN, *Primary Examiner.*

ALDRICH F. MEDBERY, *Examiner.*